J. C. LINCOLN.
APPARATUS FOR PRESERVING.
APPLICATION FILED DEC. 14, 1908.

1,102,769.

Patented July 7, 1914.

WITNESSES:

INVENTOR,
John C. Lincoln,
By Baker, Hostler & Hull
ATTYS.

UNITED STATES PATENT OFFICE.

JOHN C. LINCOLN, OF EAST CLEVELAND, OHIO, ASSIGNOR TO THE ELECTRIC MEAT CURING COMPANY, OF CLEVELAND, OHIO, A CORPORATION OF OHIO.

APPARATUS FOR PRESERVING.

1,102,769.

Specification of Letters Patent.

Patented July 7, 1914.

Application filed December 14, 1908. Serial No. 467,384.

*To all whom it may concern:*

Be it known that I, JOHN C. LINCOLN, a citizen of the United States, residing at East Cleveland, in the county of Cuyahoga and State of Ohio, have invented a certain new and useful Improvement in Apparatus for Preserving, of which the following is a full, clear, and exact description, reference being had to the accompanying drawings.

This invention relates to an apparatus for preserving with the aid of the electric current, the object of the invention being to provide such apparatus in a form where the preserving process may be carried on continuously, and contamination of the preserving medium by products of electrolysis, or the disintegrating electrodes, will be avoided. In curing meat, for example, an electric current passed through the brine and meat shortens the time required for curing. The action of the electricity, however, disintegrates the electrodes, and such disintegrated material, as well as the chemical products of the electrolysis, must not be allowed to contaminate the meat. The electricity also tends to heat the brine, and, to render the process rapid, it is desirable to provide means for continuously cooling the brine, and such means must be in a form not acted on by the electric current to contaminate the brine or meat.

In the present invention, I provide means for establishing a flow of the liquid surrounding the electrodes away from the place where the meat is cured, so that the products of electrolysis and the disintegrating electrodes are not allowed to commingle with the meat, and I provide a system of cooling pipes within the curing tank made of a material which is not electrolyzed by the current.

The particular characteristics of my apparatus by which I carry out the desired results are hereinafter more fully explained and the essential features summarized in the claims.

Figure 1:
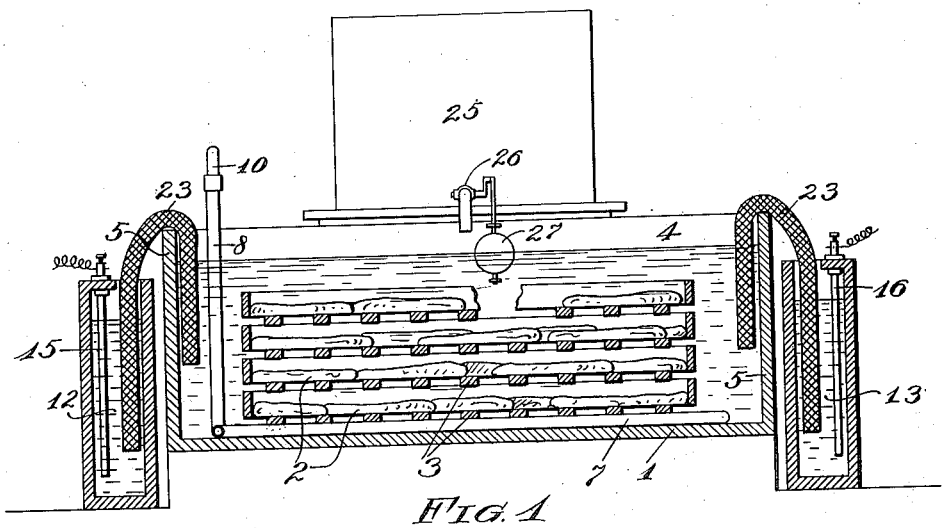
Figure 2:
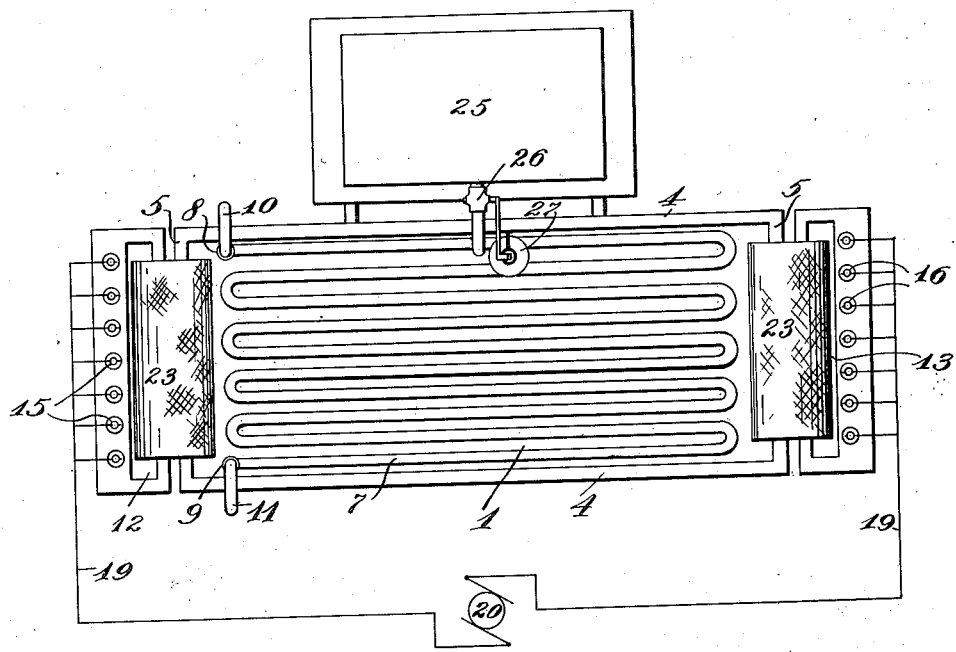

In the drawing, Figure 1 is a vertical section through my curing tank, showing the adjacent parts, and the cooling pipe, etc., and Fig. 2 is a plan of such apparatus.

As shown in the drawings, 1 represents a curing tank adapted to contain meat 2, which is separated by suitable frames 3, which carry the meat and allow its convenient installation in the tank and removal therefrom. The curing tank proper has a suitable bottom, side walls 4, and end walls 5. Beyond the end walls are suitable vessels or compartments 12 and 13 for a purpose hereinafter explained.

Within the curing tank and between the end walls 5 is a coil of cooling pipe 7. This pipe extends back and forth in convolutions along the bottom of the tank, as shown in Fig. 2, and has uprights 8 and 9 leading outside of the tank. This much of the pipe is made of some material which will not be electrolyzed by an electric current, as for example porcelain. With the pipes 8 and 9 connect pipes 10 and 11 which lead from any cooling system, and are adapted to allow the circulation through the cooling pipe of compressed ammonia or other usual cooling medium.

In the compartments 12 and 13 are the electrodes 15 and 16 which are arranged in two sets, each set being preferably coupled in multiple as shown. The set of electrodes 15 constitute one terminal of an electric circuit 19, and the electrodes 16, the other terminal, such circuit having a suitable source of current 20.

Extending into the vessels 12 and 13 and over the upper ends of the walls 5 and then downwardly into the curing tank are large wicks 23 of woven fabric or other material. These wicks are saturated with brine and serve the purpose of carrying the current between the electrodes and tank. The ends of the wicks in the chambers 12 and 13 are lower than the ends in the tanks, so that the wicks act by capillary attraction to make a slow but continuous transfer of liquid from the tank into the chambers containing the electrodes. The flow of the liquid being in this direction, it is impossible for any contamination or products of electrolysis to pass from the electrodes to the meat.

The outward passage of liquid by means of the wicks 23 acts to lower the level of the brine in the tank, and to compensate for this I provide a tank 25 adapted to contain brine and discharge it into the central portion of the curing tank, and I control the discharge valve 26, according to the level of the liquid in the tank. This control may, for example, be by a float 27 made of some material, as glass, which will not be acted upon by the electric current. By this means, the brine can be maintained at the proper level in the tank notwithstanding the outward flow thereof.

It will be seen that I have, by the above means, provided a very simple apparatus for carrying on the process. The products of electrolysis and the disintegrating electrodes never can reach the meat, and the brine is kept at the proper level and at the proper temperature. It is not necessary to stop the operation either to cool the brine or to regulate its level in the tank or to remove any contamination. By using porcelain or other non-metallic cooling pipes within the tank I secure a more direct cooling and at the same time do not contaminate the brine.

By using an alternating current, or a direct current periodically reversed, as set out in my co-pending applications, the formation of chlorin or alkali salts in any undesirable amount at the electrodes may be prevented. If a direct current is used continuously without reversing, the chlorin and sodium hydrate, etc., in solution, is immaterial, for it never reaches the meat, while a suitable hood and fan may take care of the escaping chlorin gas. The dynamo shown at 20 is intended to be illustrative of means for producing any of these forms of current.

Having thus described my invention, what I claim is:

1. An apparatus for preserving comprising a tank, means for maintaining an outward flow of the preservative liquid therefrom, electrodes separated from such preservative agent, capillary conductors between the electrodes and agent, and means for passing an electric current through the agent via said capillary conductors.

2. An apparatus for preserving comprising a vessel, wicks leading from opposite ends thereof and arranged to constitute outgoing liquid carriers, and means for passing electric current through such wicks and the contents of the vessel.

3. An apparatus for preserving comprising a tank, trays or racks therein for holding articles for preservation, electrodes placed in vessels outside of the tank, and wicks extending from the tank to the vessels and arranged to constitute outgoing capillary siphons.

4. A preserving apparatus consisting of a vessel adapted to contain the article to be preserved, a liquid preservative agent, an electrode separated from such agent, a capillary conductor for the electric current between the liquid about the electrodes and the contents of the vessel, said conductor constituting also an outgoing siphon, and means for supplying fresh preservative liquid to the vessel to maintain the same at a substantially constant level and cause an outward flow of such liquid through the capillary conductor.

5. A preserving apparatus having a preserving tank, separated electrodes, capillary conductors between the liquid about the electrodes and the tank contents, and means for causing an outward flow of liquid preservative agent along such conductors, and means for maintaining the level of the liquid in the tank.

6. In a preserving apparatus, the combination of a preserving vessel, electrodes located in compartments separate from the vessel and carrying liquid at a lower level than said vessel and capillary conductors constituting outward carriers for fluid between the vessel proper and the compartments containing the electrodes, at least one of such conductors being at the same time an inward carrier for electric current.

In testimony whereof, I hereunto affix my signature in the presence of two witnesses.

JOHN C. LINCOLN.

Witnesses:
  ALBERT H. BATES,
  BRENNAN B. WEST.